US012767344B2

(12) United States Patent

Erdemli et al.

(10) Patent No.: US 12,767,344 B2

(45) Date of Patent: Oct. 20, 2026

(54) AIRCRAFT

(71) Applicant: Tusas—Turk Havacilik Ve Uzay Sanayii Anonim Sirketi, Kahramankazan (AR)

(72) Inventors: Mehmet Erdemli, Kahramankazan (AR); Yunus Emre Muslubas, Kahramankazan (AR)

(73) Assignee: Tusas—Turk Havacilik Ve Uzay Sanayii Anonim Sirketi, Kahramankazan (TR)

(*) Notice: Subject to any disclaimer, the term of this patent is extended or adjusted under 35 U.S.C. 154(b) by 0 days.

(21) Appl. No.: 18/963,612

(22) Filed: Nov. 28, 2024

(65) Prior Publication Data

US 2025/0206455 A1 Jun. 26, 2025

(30) Foreign Application Priority Data

Dec. 26, 2023 (TR) ............................... 2023/018475

(51) Int. Cl.
*B64D 33/02* (2006.01)

(52) U.S. Cl.
CPC .................................... *B64D 33/02* (2013.01)

(58) Field of Classification Search
CPC .............. B64D 33/02; B64D 2033/022; B64D 2033/026; F02C 7/04
See application file for complete search history.

(56) References Cited

U.S. PATENT DOCUMENTS

| | | | | |
|---|---|---|---|---|
| 3,509,568 | A * | 4/1970 | Manning ................ | B64D 33/02 219/209 |
| 7,854,778 | B2 * | 12/2010 | Groom .................. | B64D 33/02 55/306 |

FOREIGN PATENT DOCUMENTS

| | | |
|---|---|---|
| CN | 208665553 | 3/2019 |
| KR | 10-2345560 | 12/2021 |
| RU | 2623031 | 6/2017 |

* cited by examiner

*Primary Examiner* — Nicholas McFall

(57) ABSTRACT

The present invention relates to a body (2), at least one engine (3) that is located on the body (2) and generates the power required for flight, at least one air inlet (4) that is located as an opening on the body (2) and allows air intake from the atmosphere, at least one air duct (5) that is located on the air inlet (4) and transmits the air it takes from the air inlet (4) to the engine (3), at least one panel (6) that is located inside the air duct (5), to which the air contacts after passing through the air inlet (4), has radar absorbing properties and allows the air to absorb the electromagnetic waves that come into contact with its surfaces.

11 Claims, 2 Drawing Sheets

AIRCRAFT

RELATED APPLICATION

This application claims the benefit of priority of Turkish Patent Application No. 2023/018475, filed on Dec. 26, 2023, the contents of which are incorporated by reference as if fully set forth herein in their entirety.

FIELD AND BACKGROUND OF THE INVENTION

The present invention relates to an aircraft with an air inlet manipulator that has low radar visibility and provides high aerodynamic performance.

Air inlet structures are parts found in aerial vehicles that can have various internal cross-sectional structures that allow air to be transported from the outside of the aircraft to the engine inlet. The shapes of these parts determine how healthily the air can be transmitted to the engine. Various pressure changes that occur in the air duct during the transmission of air also affect the air transmission quality. The structure of the air inlet and ducts also affects the radar visibility of the aircraft. Radar absorbing structures are structures that reflect electromagnetic waves coming to them in a predetermined frequency range as little as possible, converting some of the electromagnetic energy into heat and trapping it in their bodies. In order to reduce the visibility of the aircraft, air inlets are produced in various shapes, and radar absorbing structures are applied to these inlets in appropriate cases. The design of the air inlets affects the aerodynamic performance and air inlet quality. For this reason, there was a need to produce an air inlet that is both aerodynamically beneficial and has low radar visibility.

The Russian patent document numbered RU2623031C1 in the state of the art mentions tools designed for aircraft construction and especially for reducing the radar visibility of multi-mode aircraft. In the invention, in order to achieve this purpose, a cage made of one or more cylindrical surfaces fixed to each other as well as the walls of the channel using radial (placed along the radius of the cage) ribs is mentioned. In the invention, an anti-radar grid is located in the air duct of the aircraft air inlet at a y angle varying between 30 and 90 degrees with respect to the longitudinal axis of the duct.

In the South Korean patent document numbered KR102345560B1 in the state of the art, a radar blocking device is mentioned. Since the radar blocking, three-dimensional porous grid structure is formed in an inclined manner, it can achieve a sufficient effect in reducing the radar reflection area while minimising the deformation of the engine duct to reduce the radar reflection area. This lightens the design load when designing the duct where the engine fan is mounted, and the duct shape minimises the effect on flight performance to reduce the radar reflection area.

In the Chinese utility model document numbered CN208665553U in the state of the art, an aircraft inlet grid is mentioned. Said application provides an air inlet grid that is both aerodynamic and low visibility. The air inlet grille not only has a high inlet efficiency, but also has a good reduction effect on the forward radar cross-section of the inlet passage.

By means of an aircraft developed with the present invention, it is aimed to reduce radar visibility while keeping the aerodynamic performance loss low.

Another aim of the present invention is to provide better aerodynamic performance of the air inlets in the aircraft.

Another aim of the present invention is to provide better fuel performance by adjusting the pressure distribution of the air going to the aircraft engine at an optimum level.

SUMMARY OF THE INVENTION

The aircraft defined in the first claim and the claims dependent on this claim, which is realised to achieve the aim of the invention, comprises a body, at least one air inlet that is located as an opening on the body and allows air to enter the body from the aerodynamic outer surface of the body, at least one engine that is located on the body or inside the body and provides the power required for the flight of the aircraft, at least one air duct that extends between the air inlet and the engine as an extension of the air inlet and directs the air it receives from the air inlet which first contacts the air towards the engine, and more than one panels that are located inside the air duct and allow it to absorb the electromagnetic waves that travel within the air duct and contact it.

The aircraft which is the subject of the invention comprises an air duct which first has a narrowing form and then gradually widens and has a curved form towards the engine, so that the static pressure of the air decreases first compared to the pressure it has while passing through the air inlet as it goes towards the engine, and then increases after passing through the air inlet.

In one embodiment of the invention, the aircraft comprises a first region in the air duct where the air passes through the panel, closer to the air intake than the engine, and in which the panel is positioned; a second region in the air duct where the static pressure of the air decreases compared to the initial state as it moves through the air duct; and a third region on the air duct, closer to the engine than the air intake, in which the static pressure of the air increases as it moves through the air duct compared to the pressure in the second zone.

In one embodiment of the invention, the aircraft comprises a pipe that is located on the body, has a flat cylindrical form and in inner part of which an air duct passing through. In the inner shell of the pipe, there is a part in a curved form on the first region, the second region and the third region, which almost surrounds a part of the air duct determined by the user.

In one embodiment of the invention, the aircraft comprises a part in a circular and inclined form in the first region so that the form in the part fits almost to the shape of the outer wall of the panel.

In one embodiment of the invention, the aircraft comprises a panel in the form of a cover that allows a part of the air entering from the air inlet to contact the part. It comprises more than one plate, each of which is positioned radially within each other at an equal rate to form a set geometry, having a cylindrical shape and between which the air passes.

In one embodiment of the invention, the aircraft comprises at least one plate positioned inclined from the centre of the air duct towards the air inlet, all of which extend out from the centre of the air inlet towards the inner wall of the pipe, ensuring that the air is distributed not only towards the panel but also towards the part.

In one embodiment of the invention, the aircraft comprises a part the inner wall shape of which in the first region is almost closer to each other along from the central axis of the air inlet towards the inner wall of the pipe, the inner wall shape of which in the second region is closer to the axis passing through the centre of the air inlet of the first region and the third region, and a part of which in the third region is farther from the central axis of the air inlet.

In one embodiment of the invention, the aircraft comprises 7 interlocking ring-shaped plates in the NACA2412 wing profile section, which have the feature of meeting the carrying force while the aircraft performs its flight duty, and whose tip is in a wider structure that adapts to the air flow.

In one embodiment of the invention, the aircraft comprises arms that form the panel, positioned in 4 parts at 90-degree angles to each other, extending along one edge of the panels perpendicular to the central axis of the air inlet.

In one embodiment of the invention, the aircraft comprises arms with a NACA0018 wing profile section, with a wider end that adapts to the air flow, having the feature of meeting the carrying force while performing the flight mission.

In one embodiment of the invention, the aircraft comprises nested panels, the distance between which increases as the centre point of the panel is moved.

BRIEF DESCRIPTION OF THE SEVERAL VIEWS OF THE DRAWINGS

The aircraft realised to achieve the aim of the present invention is shown in the attached figures, and of these figures.

DESCRIPTION OF SPECIFIC EMBODIMENTS OF THE INVENTION

Figure 1:
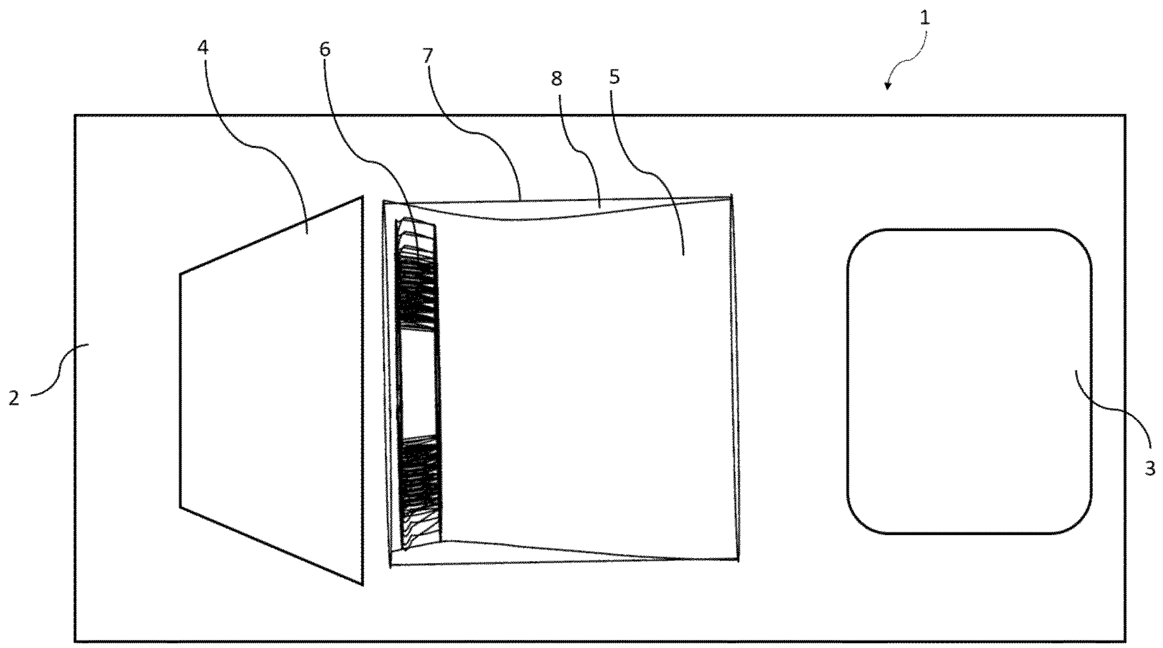
FIG. 1 shows the sectional view of the aircraft.

The parts in the figures are numbered one by one and the equivalents of these numbers are given below.

1. Aircraft
2. Body
3. Engine
4. Air inlet
5. Air duct
  501. First region
  502. Second region
  503. Third region
6. Panel
  601. Plate
  602. Arm
7. Pipe
8. Part The aircraft (1) comprises a body (2), at least one engine (3) that is located on the body (2) and generates the power required for flight, at least one air inlet (4) that is located as an opening on the body (2) and allows air intake from the atmosphere, at least one air duct (5) that is located on the air inlet (4) and transmits the air it takes from the air inlet (4) to the engine (3), at least one panel (6) that is located inside the air duct (5), to which the air contacts after passing through the air inlet (4), has radar absorbing properties and allows the air to absorb the electromagnetic waves that come into contact with its surfaces.

The aircraft (1) which is the subject of the invention comprises an air duct (5) having a curved form which first narrows and then widens as it gets closer to the engine (3) so that, according to the pressure it has in the air inlet (4), the pressure of the air going from the air inlet (4) towards the engine (3) first decreases and the flow rate increases and then its pressure increases and the flow rate decreases.

The body (2) on the aircraft (1) comprises at least one engine (3) that generates the power required for the flight of the aircraft (1) and at least one air inlet that allows the air coming from the atmosphere to enter the engine (3). At least one air duct (5) on the body (2) allows the air entering from the air inlet (4) to be transmitted to the engine (3). In the air duct (5), there is at least one panel that absorbs the electromagnetic waves and radar waves that the air encounters after passing through the air inlet (4), thus providing radar invisibility.

The pressure changes in the air entering from the air inlet (4) and going towards the engine (3) ensure that the air is used effectively and its aerodynamic benefits are obtained. In order to provide these pressure changes, it comprises an air duct with an almost curved form that first narrows and then widens in the area where the air moves and approaches the engine (3) in order to ensure that the static pressure of the air decreases first and then increases, taking the pressure of the air at the inlet of the air inlet (4) as reference. In this way, high aerodynamic performance is achieved by obtaining pressure changes. (FIG. 1)

Figure 3:
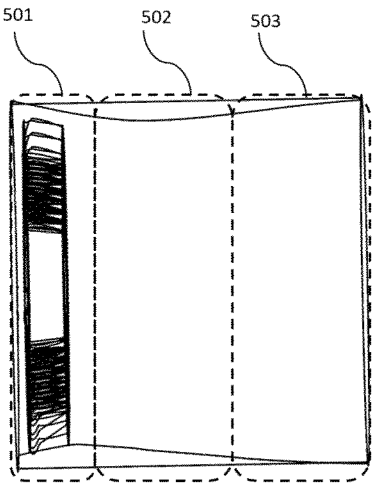
FIG. 3 shows the sectional view of the first region, second region, and third region.

In an embodiment of the invention, the aircraft (1) comprises, on the air duct (5), a first region (501) which is located in the position where the air passes through the panel (6), is closer to the air inlet (4) than the engine (3), and in which the panel (6) is located; a second region (502) where the air pressure decreases and the flow rate increases as the air on the air duct (5) progresses in the air duct (5); and a third region (503) which is closer to the engine (3), and in which the air pressure increases and the flow rate decreases as the air progresses in the air duct (5). There are three regions located on the air duct (5). In the air duct (5), there is a first region (501) in which the panel is positioned, which is closer to the air inlet (4) than the engine (3) in the part where the air passing through the panel (6) first passes through; a second region (502) in which the inner walls of the duct narrow so that the static pressure of the air decreases as it moves through the air duct (5); and a third region (503) that is closer to the engine (3) than the air inlet (4), inner walls of which widens compared to the second region (501) so as to increase the pressure of the air as it moves through the air duct (5). In this way, the air pressure change proceeding through the air duct (5) is provided and the effective use of air by the engine is ensured. (FIG. 3)

Figure 2:
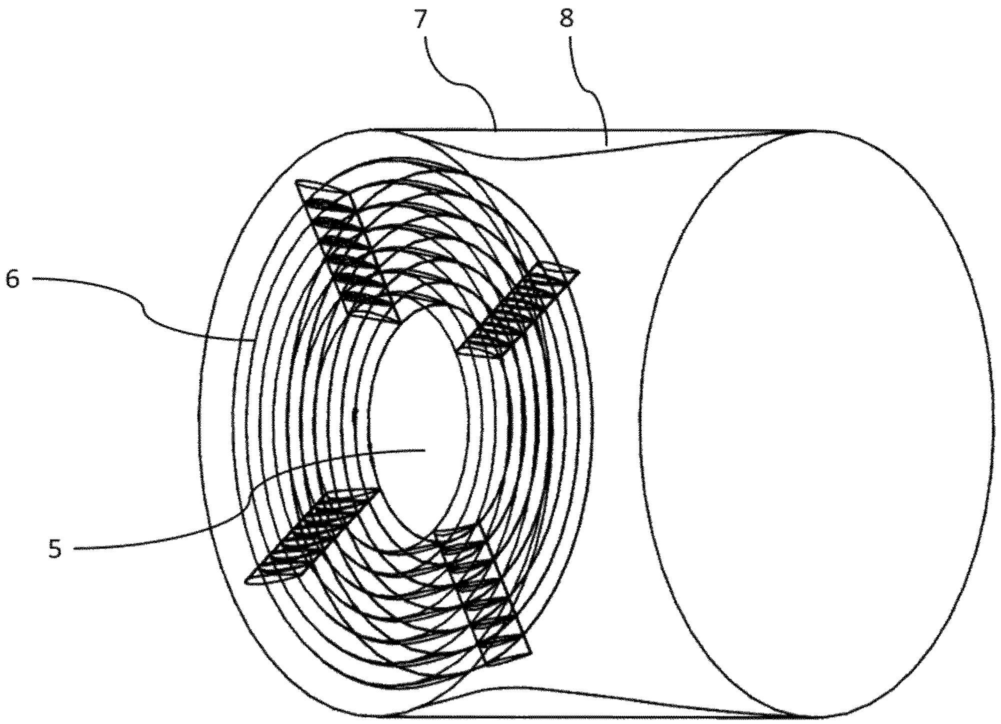
FIG. 2 shows the perspective view of air duct, panel, pipe and part.

In one embodiment of the invention, the aircraft (1) comprises a pipe (7) in a flat cylindrical form, is located on the body (2) and through which an air duct (5) passes, and a part (8) in the form of a top, located in the pipe (7) in a way that almost completely surrounds the air duct (5) on the inner wall of the pipe (7), and comprises the first region (501), the second region (502) and the third region (503). There is a pipe (7) in the air duct (5), and a part (8) in a curved form that comprises the first region (501), the second region (502) and the third region (503) in the pipe (7). By means of the twisted form of the part (8), a change in air pressure can be created, and flow separations that cause severe total pressure loss can be prevented. (FIG. 2)

In one embodiment of the invention, the aircraft (1) comprises a part (8), the form of which in the first region (501) is circular and inclined in shape to be compatible with the outer wall form of the panel (6) In this way, the part (8) ensures that the air entering from the panel (6) is used in a highly efficient manner by moving through the pipe (7).

Figure 4:
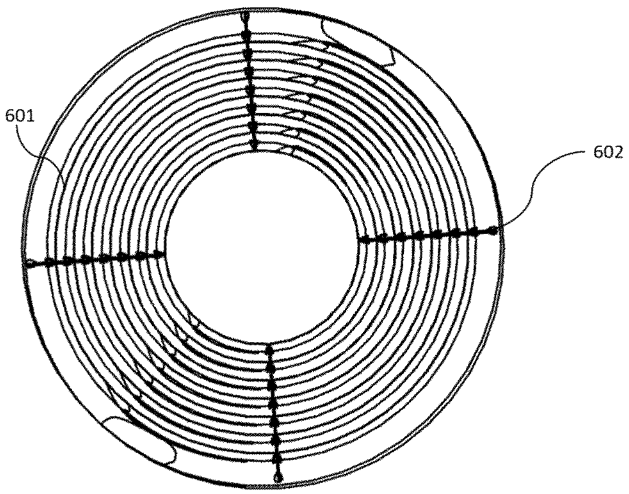
FIG. 4 shows the front view of plate and arm.

In one embodiment of the invention, the aircraft (1) comprises a panel (6) that acts as a cover, allowing some of the air to hit the part (8), and multiple plates (601) that are located on the panel (6) and are positioned radially in a way that is equally nested with each other, forming a set geometry, in a cylindrical form, allowing air to pass between them. The panel (6) has a structure that will allow some of the air to hit the part (8) and for a pressure change to occur. The ring-shaped form of the plate (601) inside the panel (6) and its radial nesting with each other ensure that the electromagnetic waves are brought into contact with the radar absorbing material more than usual and are absorbed. (FIG. 4)

In one embodiment of the invention, the aircraft (1) comprises at least one plate (601) inclined towards the air inlet (4) from the direction in which the air duct (5) extends along its length, each of which extends outwardly facing the inner wall of the pipe (7), thus allowing the air to be distributed partially towards the part (8). The form of the plate (601) within the panel (6) is inclined to form an angle predetermined by the manufacturer, with its tip facing the outside of the air inlet (4) and its inner part facing the centre of the air duct (5). In this way, both radar absorption and aerodynamic benefits are provided.

In one embodiment of the invention, the aircraft (1) comprises the part (8) the inner wall form of which gets, in the first region (501), closer to the pipe (7) wall as it moves from the direction in which the air inlet (4) extends along its length, the part (8) the inner wall form of which is, in the second region (502), closer to the direction in which the air inlet (4) extends along its length than the first region (501) and the third region (503), and the part (8), that, in the third region (503), moves away from the direction in which the air inlet (4) extends along its length. The form of the part (8) in the first region (501) is in a form that will get closer to the pipe (7) inner wall. The form of the part (8) in the second region (502) is in a form in which the inner walls are closer to each other than the first region (501) and the third region (502). The diameter of the air duct (5) in the second region (502) is less than the diameter of the first region (501) and the third region (503). The piece of the part (8) in the third region (503) is wider than the inner wall in the second region (502). The diameter of the air duct (5) in the third region (503) is larger than the diameter in the second region (502). In this way, pressure changes are created in the air passing through the air duct (5) and more efficient use is provided.

In one embodiment of the invention, the aircraft (1) comprises a plate (601) with a wing profile section, the end of which facing the air flow is in a wider form, and which provides the carrying force during the flight of the aircraft (1). The air is effectively directed within the air duct (5) by means of the fact that the plate (601) has a wing profile section.

In one embodiment of the invention, the aircraft (1) comprises multiple arms (602) that are located within the panel (6) and are positioned at 90-degree angles facing each other, extending perpendicular to the direction in which the air inlet (4) extends along one edge of the plates (601). In this way, the air is effectively directed within the air duct (5). (FIG. 4)

In one embodiment of the invention, the aircraft (1) comprises an arm (602) with a wing profile section, the end of which facing the air flow is in a wider form, and which provides the carrying force during the flight of the aircraft (1). In this way, the air is effectively directed within the air duct (5).

In one embodiment of the invention, the aircraft (1) comprises nested plates (601) with the distance between them increasing towards the centre of the panel (6). In this way, effective radar absorption is provided, while the decrease in aerodynamic performance is minimised.

The invention claimed is:

1. An aircraft comprising:

a body;

at least one engine located on the body and configured to generate power required for flight;

at least one air inlet located as an opening on the body and configured to allow air intake from an atmosphere;

at least one air duct connected to the at least one air inlet and configured to transmit air received from the at least one air inlet to the at least one engine;

at least one panel located inside the at least one air duct, the at least one panel having radar absorbing properties and configured to absorb electromagnetic waves that come into contact with surfaces of the at least one panel, air contacting the at least one panel after passing through the at least one air inlet;

wherein the at least one air duct has a curved form that first narrows and then widens toward the at least one engine such that a static pressure of the air going from the at least one air inlet toward the at least one engine first decreases while a flow rate of the air increases, and then the static pressure of the air increases while the flow rate of the air decreases.

2. The aircraft according to claim 1, wherein the at least one air duct comprises:

a first region located where the air passes through the at least one panel, the first region being closer to the at least one air inlet than to the at least one engine, and in which the at least one panel is positioned;

a second region in which an air pressure decreases and the flow rate increases as the air in the at least one air duct progresses through the at least one air duct; and a third region closer to the at least one engine than to the at least one air inlet, in which the air pressure increases and the flow rate decreases as the air progresses through the at least one air duct.

3. The aircraft according to claim 2, further comprising:

a pipe having a cylindrical form, the pipe being located on the body, and the at least one air duct passing through the pipe; and a part located on an inner wall of the pipe and surrounding a portion of the at least one air duct, the part extending through the first region, the second region, and the third region.

4. The aircraft according to claim 3, wherein the part has a circular and inclined shape in the first region that is compatible with an outer wall form of the at least one panel.

5. The aircraft according to claim 3, wherein the at least one panel acts as a cover allowing some of the air to contact the part, and the at least one panel comprises multiple plates positioned radially and nested with each other at equal intervals, the multiple plates having a cylindrical form and defining passages therebetween through which the air passes.

6. The aircraft according to claim 5, wherein the multiple plates are inclined toward the at least one air inlet from a direction in which the at least one air duct extends along a length thereof, each of the multiple plates extending outwardly toward the inner wall of the pipe, thereby allowing the air to be distributed partially toward the part.

7. The aircraft according to claim 5, wherein each of the multiple plates has a wing profile cross-section with a wider end facing an incoming air flow, and is configured to provide a lifting force during flight of the aircraft.

8. The aircraft according to claim 5, further comprising multiple arms located within the at least one panel, the multiple arms being positioned at 90-degree angles to each other and extending perpendicular to a direction in which the at least one air duct extends along one edge of the multiple plates.

9. The aircraft according to claim 8, wherein each of the multiple arms extends along one edge of the multiple plates and is configured to direct airflow within the at least one air duct.

10. The aircraft according to claim 5, wherein the multiple plates are nested and non-uniformly spaced relative to each other.

11. The aircraft according to claim 3, wherein the at least one air duct has a cross-sectional area in the second region that is smaller than a cross-sectional area in each of the first region and the third region.

* * * * *